June 27, 1961 J. C. VAN RIJN 2,990,105
CONTROLLED BREATHING MOTOR
Filed Sept. 10, 1958

INVENTOR
*JACOBUS C. VAN RIJN*

BY *Andros and Smith*

ATTORNEYS

United States Patent Office 2,990,105
Patented June 27, 1961

2,990,105
CONTROLLED BREATHING MOTOR
Jacobus C. van Rijn, Woodstock, N.Y., assignor to Rotron Manufacturing Co., Inc., Woodstock, N.Y., a corporation of New York
Filed Sept. 10, 1958, Ser. No. 760,122
5 Claims. (Cl. 230—117)

My invention relates to electric motors and more particularly to means by which oxidation of the lubricant is reduced, and to means by which the motor may "breathe" under operating conditions where the temperature of the motor varies widely.

In electric motor design, one of the major considerations is to provide the best possible operating conditions for the bearings. With modern insulating materials the motor windings have become virtually indestructible, even under the considerably higher operating temperatures of the windings which have resulted from the more and more compact designs which have become customary. Thus, the life of an electric motor is nowadays largely governed by the life of its bearings.

The life of a motor bearing depends on the materials used and on the design; and also on proper lubrication and the retention, replenishment, and replacement of the lubricant used. The generally higher temperatures at which motors are required to run, partly because of more compact design and partly because of even higher ambient temperatures, particularly in military designs, inevitably results in higher operating temperatures for the lubricants themselves. With increase in lubricant temperature, the chemical stability of the lubricant rapidly decreases and, in order to maintain proper lubrication over any considerable time, it therefore becomes increasingly important to retard oxidation of the lubricant because such oxidation is the major source of lubricant deterioration.

Oxidation of the lubricant in the bearings of an electric motor is dependent in a large measure upon the supply of oxygen from the ambient air in and around the motor. Prevention of ambient air reaching the lubricant in the motor bearings is therefore of prime importance.

Whenever an electric motor is used to drive an air-moving device, such as a fan or a blower, there will be found different levels of static air presssure around the motor case resulting from the velocity pressure gradients around the case induced by the moving air. Whenever the motor is mounted in close contact with a centrifugal or similar blower, the air pressure differential over the motor bearing adjacent the blower may become as high as the total pressure built up by the blower. Such pressure differentials will result in the air currents passing through the bearings and thereby greatly increase the oxidation of the lubricant of the bearing and reduce its useful life. In short, with any motor driving an air-moving device, bearing life becomes influenced by the air pressure differentials, and maintenance of bearing life becomes a problem. The problem increases rapidly in magnitude with higher operating temperatures and with increasingly compact designs.

It is therefore an object of the present invention to provide a structure whereby the movement of air through the bearings of an electric motor driving a fan, blower, or the like, is virtually or entirely eliminated.

It is a further object of my invention to provide such structure in a manner that does not require an increase in the size of the motor, and in a manner that adds little to the cost of manufacture.

Other and further objects and advantages of my invention will appear from the following specification taken with the accompanying drawings in which like reference characters refer to similar parts in the several views and in which.

In an attempt to eliminate the movement of air through the bearings, we may first consider air entering the motor at some point and leaving the motor at some other point, that is, passing through the motor. This can simply be avoided by providing only one single aperture in the motor case at the point where the drive shaft leaves the motorcase and whereby the motorcase becomes a dead-end enclosure or vessel.

Such a procedure in itself, however, does not entirely eliminate the flow of air through said one point, there remaining two causes for movement of air, viz., temperature changes of the air trapped inside the hollow of the motor and secondly, changes in static air pressure at that point resulting either from changes in barometric pressure or from changes in the static pressure distribution around the motorcase as will result from starting and stopping fans or blowers driven by this motor or by changes in the static pressure levels during operation of such fans or blowers, a significant practical example of which would be pulsations in the fan or blower air delivery.

Figure 1:
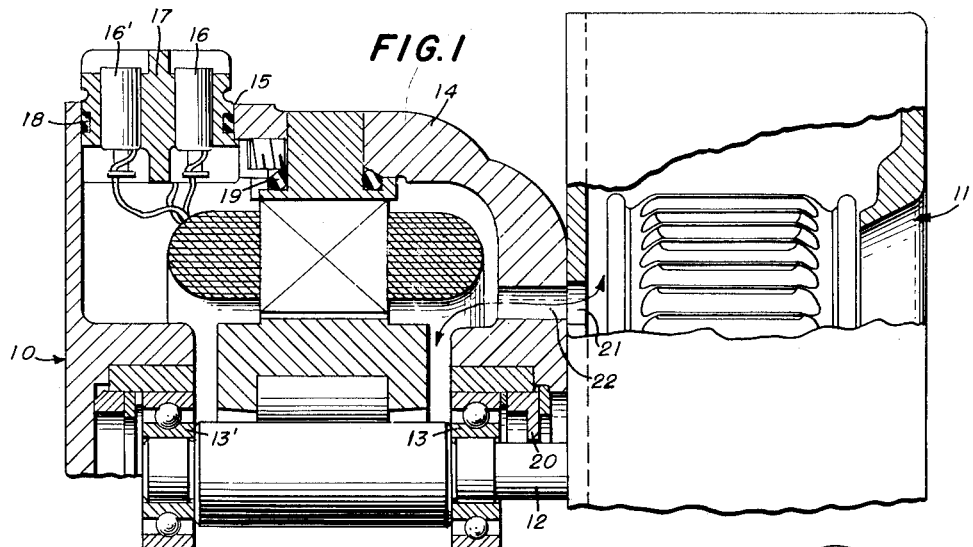
FIG. 1 is a fragmentary sectional view of a motor driven centrifugal blower illustrating one embodiment of the invention.

A practical realization for obtaining the dead-end enclosure is shown in FIG. 1.

The motor 10 drives a blower 11 by means of a shaft 12 mounted in bearings 13, 13', rigidly carried in the motor case 14. Motor case 14 is provided with an aperture 15 through which electric leads are introduced into the motor.

The electric leads such as 16, 16', are sealed in an airtight manner in plug 17 that closely fits in aperture 15. An O-ring 18 may be mounted in a groove in plug 17 to assure air-tightness. Similar O-rings such as 19 may be used about any motor part that extends through motor case 14. Other sealing devices may, of course, be used instead of O-rings which are merely an illustration of one known airtight seal.

The back of motor 10 is solid and therefore airtight.

A cover element 20 is mounted adjacent the bearing 13. Element 20 fits about the shaft 12 as snugly as is practical without placing a friction load on the shaft, and may be in the nature of a labyrinth seal. Air flow through the bearing and between the shaft 12 and element 20 therefore would require a relatively high pressure drop between the inside of the motor and the surrounding air.

I now provide a deliberate opening 21 in the blower case and a corresponding opening 22 in the motor case, whereby no appreciable pressure drop can occur and therefore the unavoidable flow of air in and out of the motor case bypasses the bearing. It will be noted that the opening of the bearing is in parallel to the deliberate breathing opening and that air will tend to flow through both in inverse relation to their respective resistance to air flow. By making the deliberate breathing opening, 21, 22 large relative to the leakage passage through seal or cover element 20 at the bearing, the breathing through the bearing is reduced to a negligible amount. It should here be remembered that I have already eliminated all continuous movement of air by closing all apertures in the motor casing including the lead wire hole and that I am only dealing with the remaining secondary effect.

Figures 2, 3:
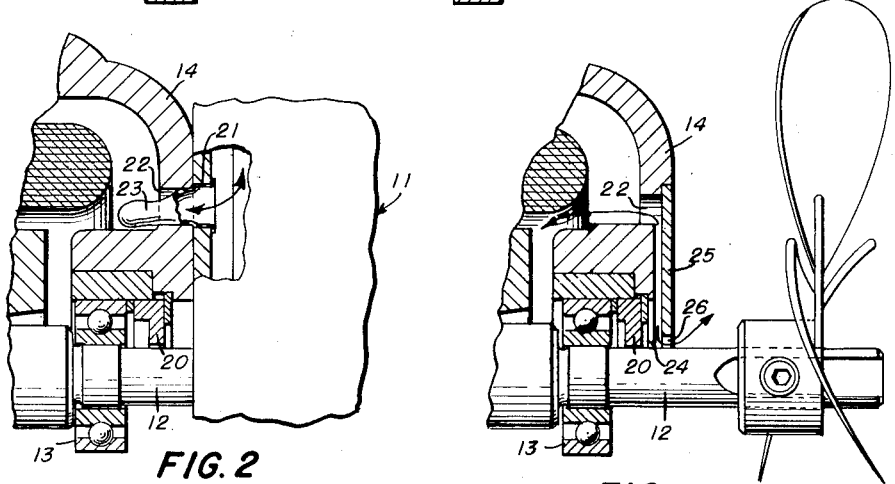
FIG. 2 is a view similar to FIG. 1 showing a variation of the device.
FIG. 3 is a fragmentary section of a motor driven propeller fan illustrating an embodiment of the invention.

In FIG. 2 the same structure is shown as in FIG. 1 but here the breathing opening 21, 22 has been fitted with a very limp bellows-like sack, for example, a small rubber bulb or bellows 23. This arrangement has the further advantage that no dust or other impurities can enter the interior of the motor, as could be the case due to frequent small movements of ambient air or from the air or gas moved by the blower. A blower assembly is shown in this illustration but it is clear that the same advantages are obtained with a propeller fan assembly or any other assembly, whereby the pressure at the bearings is different from the ambient pressure around the motor case.

In FIG. 3 is shown the application of a slightly different form of my invention to a propeller fan. The basic object is to equalize the air pressure at both sides of the bearing so that no air will flow through the bearing. A deliberate passage 22 in parallel to the bearing 13 will only accomplish this if the pressure levels at the ends of this passage are the same as the pressure levels at the sides of the bearing. In practice this may not be the case, because the air at the upstream side of a propeller or behind the wheel of a centrifugal blower is very turbulent.

A simple method of equalizing the air pressure level at the outside of the bearing and the outside of the deliberate air passage is to provide a cavity 24 at the outside of the bearing, with an opening 26 toward the outside which is close to the shaft and with the outside of the deliberate air passage terminating in said cavity.

The cavity is formed by a cover plate 25 that extends over opening 22 and encircles shaft 12. The passage between the motor casing 14 and the cover plate 25 must, of course, be as large as practical to reduce the pressure drop therethrough and the cover plate 25 should encircle the shaft closely enough to hold the necessary movement of air to a minimum.

Figure 4:
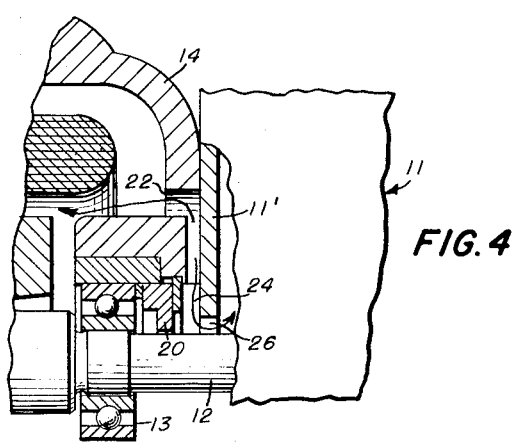
FIG. 4 is a view similar to FIG. 3 showing the same embodiment used with a blower.

As seen in FIG. 4 the embodiment of my invention described in FIG. 3 may be applied to a blower assembly. In FIG. 4, the cover plate 25 is the back 11' of blower casing 11.

It will be seen from the above that I have devised a structure which eliminates the difficulties of lubrication of electric motors, or the like, caused by oxidation of lubricant in the bearings.

While I have shown and described particular embodiments of my invention, further modifications and arrangements will occur to those skilled in the art. I desire that it be understood, therefore, that this invention is not limited to the forms shown but rather as defined by the scope of the appended claims.

Having described my invention what I claim as new and desire to secure by Letters Patent is:

1. In an electric motor having a generally imperforate casing and a rotatable shaft, an aperture in said casing through which said shaft extends, a bearing in said aperture surrounding and supporting said shaft, a substantially airtight seal element surrounding said shaft closely exteriorly of said bearing, a cover plate secured peripherally to said casing radially outwardly of said aperture and closely encircling said shaft to form an annular cavity around said shaft between said cover plate and said seal, and a breathing opening in said casing, said breathing opening lying between the periphery of said cover plate and the aperture through which said shaft extends and in communication with said annular cavity.

2. The motor of claim 1 in which a flexible element is interposed in said breathing passage to permit change of pressure within said casing to agree with pressures exterior to said casing without interchange of air.

3. In an electric motor, a generally imperforate motor casing, a shaft opening in said casing, a rotatable shaft mounted in and having one end protruding from said casing through said shaft opening, bearings for said rotatable shaft mounted in said casing, one said bearing lying in said shaft opening adjacent the protruding end of said shaft, a separate seal element in said shaft opening encircling said shaft and mounted in an airtight manner on said casing exteriorly of said bearing and closely fitting said shaft to minimize airflow through said bearing, a relatively large breathing opening formed in said casing adjacent said bearing radially outwardly of said seal element, a limp bellows-like sack mounted in said breathing opening and extending into said casing whereby the pressure within and without said casing will vary together without interchange of air and the possibility of foreign matter being introduced into the motor is avoided.

4. In an electric motor, a generally imperforate motor casing, a shaft opening in said casing, a rotatable shaft mounted in and having one end protruding from said casing through said shaft opening, bearings for said rotatable shaft mounted in said casing, one said bearing lying in said shaft opening adjacent the protruding end of said shaft, a separate seal element in said shaft opening encircling said shaft and mounted in an airtight manner on said casing exteriorly of said bearing and closely fitting said shaft to minimize airflow through said bearing, a relatively large breathing opening formed in said casing adjacent said bearing radially outwardly of said seal element whereby the pressure within the casing and the pressure outside said seal element will vary together, equalization of said pressures taking place through said opening and not through said bearing and a cover plate closely encircling said protruding shaft spaced from said seal element and secured peripherally to said casing to form an annular cavity outwardly of said seal element.

5. The motor of claim 4 in which said cover plate is a blower casing element secured to said motor casing.

References Cited in the file of this patent

UNITED STATES PATENTS

| 1,697,279 | Klemm | Jan. 1, 1929 |
| 1,998,087 | Koch | Apr. 16, 1935 |
| 2,246,272 | Davidson | June 17, 1941 |
| 2,260,042 | McMahan | Oct. 21, 1941 |
| 2,423,436 | Blom | July 8, 1947 |
| 2,634,687 | Smith | Apr. 14, 1953 |
| 2,769,105 | Altschwager et al. | Oct. 30, 1956 |
| 2,868,438 | Gammon et al. | Jan. 13, 1959 |

FOREIGN PATENTS

| 573,058 | France | June 18, 1924 |